Oct. 10, 1939.  R. S. WHITTINGTON  2,175,235
AUTOMATIC CLUTCH OPERATING DEVICE
Filed June 13, 1932   6 Sheets-Sheet 4

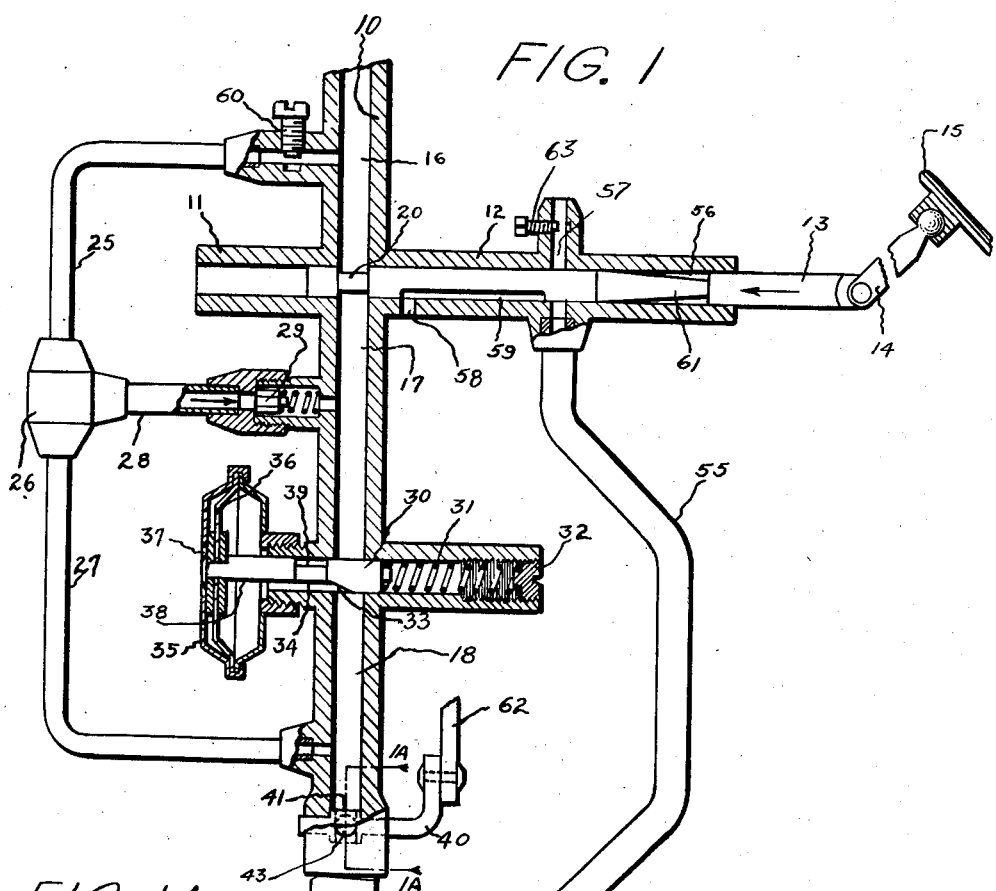

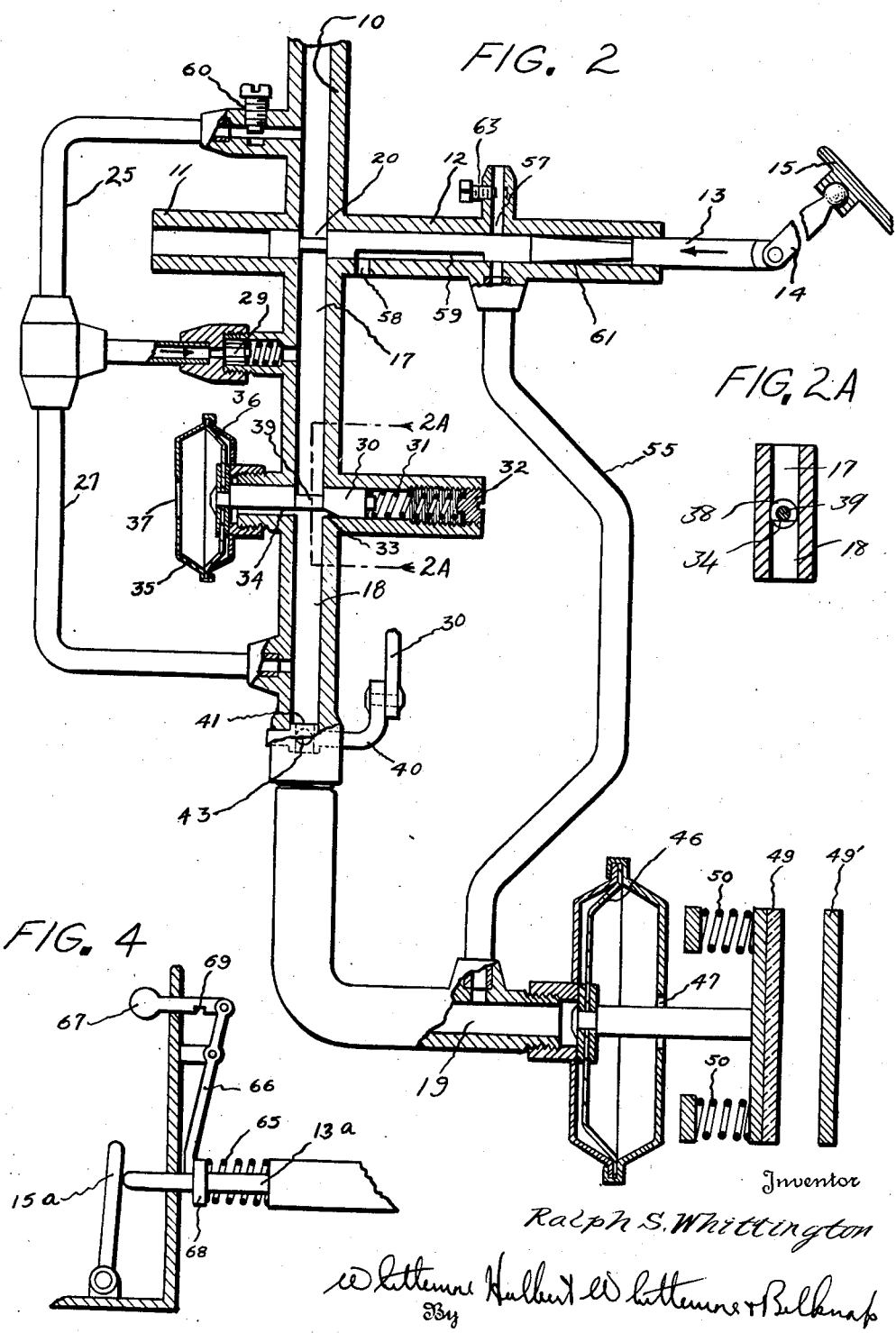

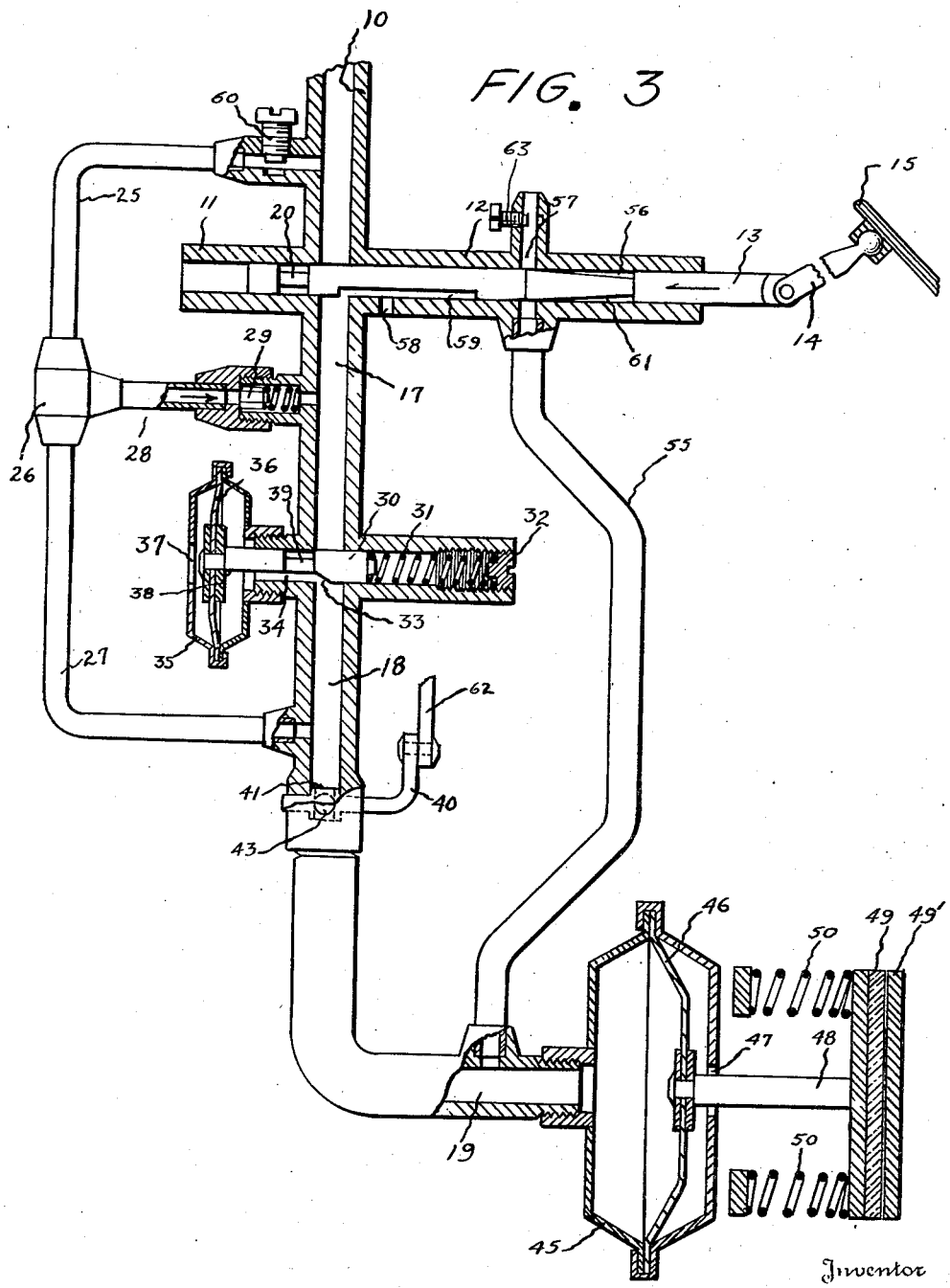

INVENTOR
Ralph S. Whittington
BY
ATTORNEYS

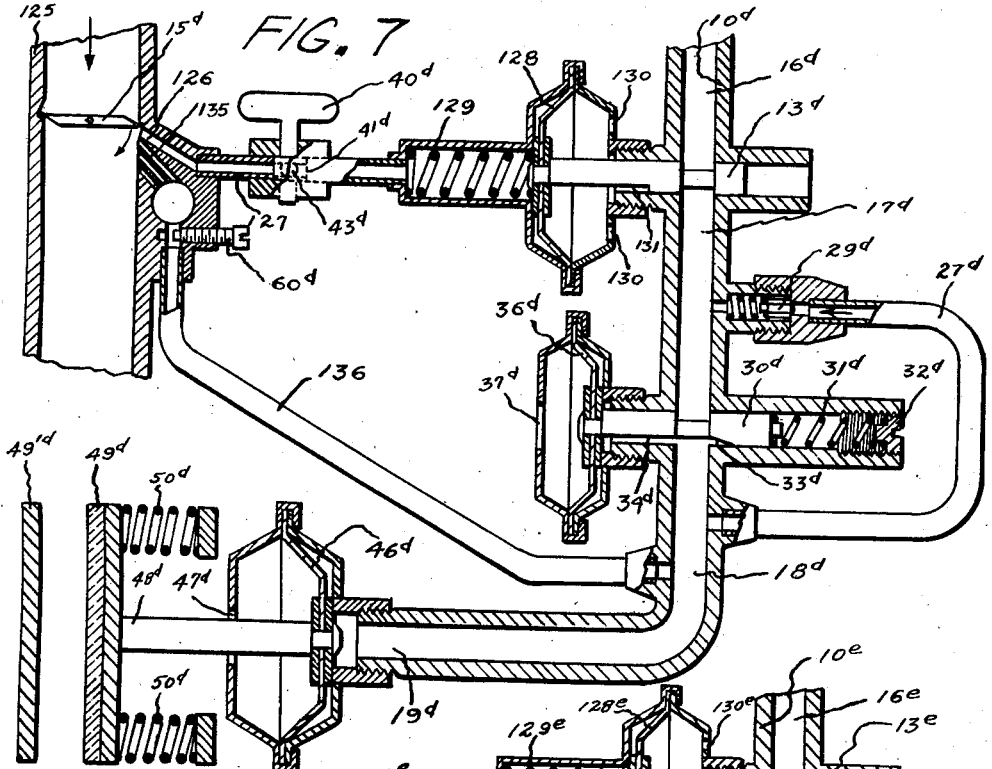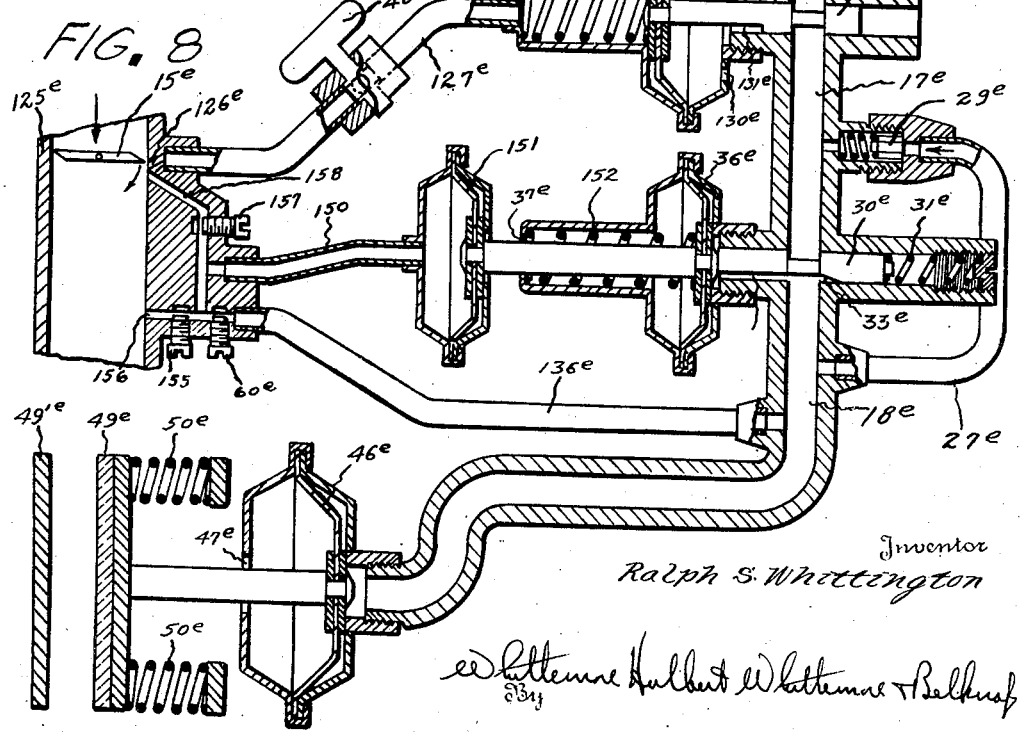

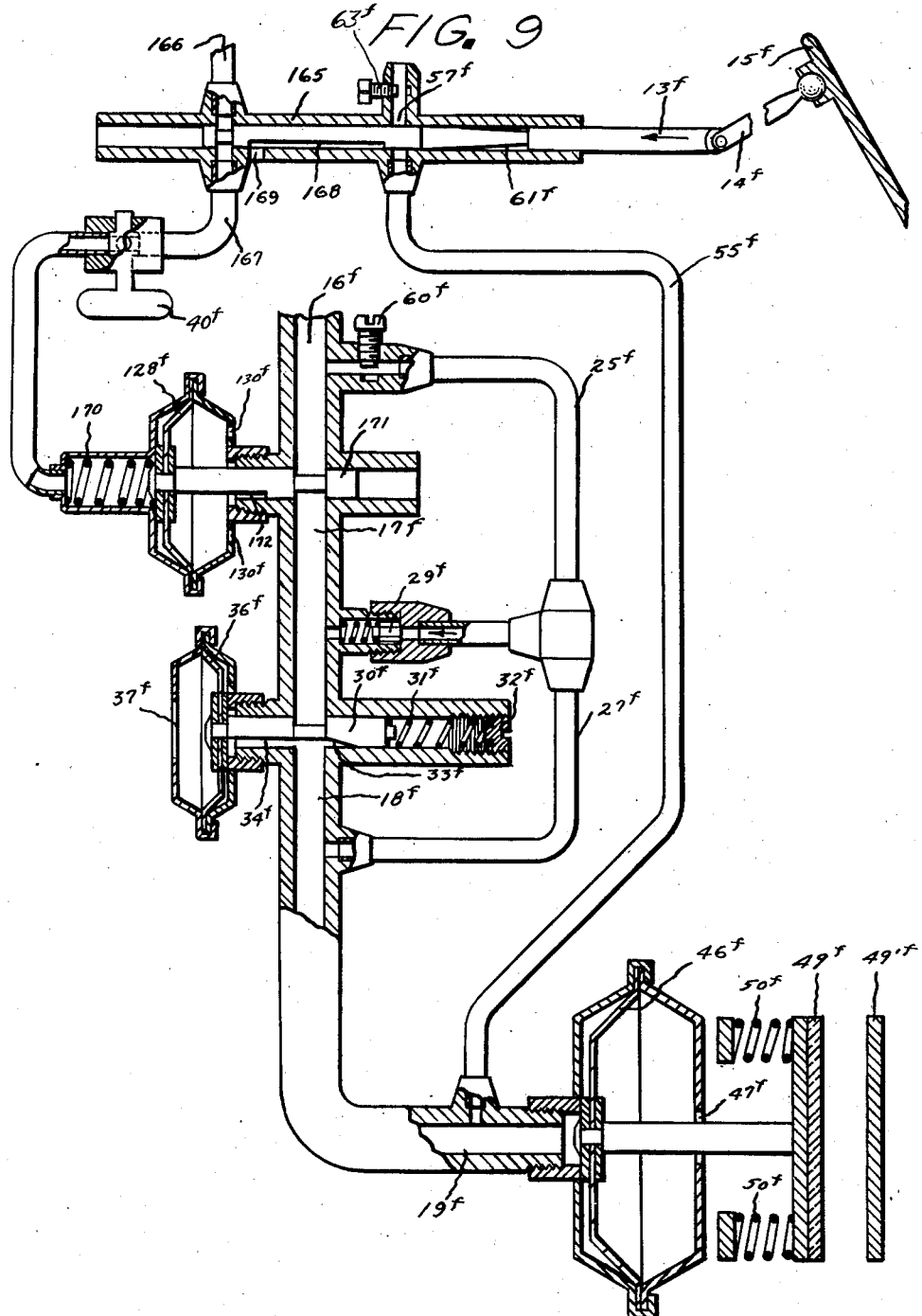

Patented Oct. 10, 1939

2,175,235

UNITED STATES PATENT OFFICE 2,175,235

AUTOMATIC CLUTCH OPERATING DEVICE

Ralph S. Whittington, Detroit, Mich., assignor to Bendix Products Corporation, South Bend, Ind., a corporation of Indiana Application June 13, 1932, Serial No. 616,959

27 Claims. (Cl. 192—.01)

This invention relates to an automatic control means for use in controlling the actuation of a clutch of a motor vehicle or the like.

One of the primary objects of this invention is to provide a control means of the above mentioned character by which the motion of the clutch plates toward contacting positions will be arrested as the plates start to contact, the arresting means being dependent in operation upon a prior contacting of the clutch plates.

A further object of this invention is to provide a control means of the above mentioned character by which the pressure with which the clutch plates engage each other may be accurately controlled.

The invention further contemplates the provision of a control means of the above mentioned character together with means for rendering this control means operative or inoperative at the will of the operator.

Still further the invention contemplates the provision of means whereby if desired the control means may be rendered inoperative upon actuation of the usual clutch pedal of the motor vehicle.

Numerous other objects and advantages of this invention will become more apparent as the following description proceeds, particularly when reference is had to the accompanying drawings, wherein:

Fig. 1 is a semi-diagrammatic view partly in section of a control means constructed in accordance with this invention;

Fig. 1A is a fragmentary sectional view taken substantially on the line 1A—1A of Fig. 1;

Fig. 2 is a view similar to Fig. 1 showing the parts of the system in one of the positions which they assume when the control means is operated;

Fig. 2A is a fragmentary sectional view taken substantially on the line 2A—2A of Fig. 2;

Fig. 3 is a view similar to Fig. 1 showing a further position which the parts of the control means assume during operation;

Fig. 4 is a semi-diagrammatic view partly in section of a means for rendering the control means inoperative;

Fig. 7 is a view similar to Fig. 1 showing a further modification of the inventive idea;

Fig. 8 is a view similar to Fig. 1 showing a still further embodiment of the invention; and Fig. 9 is a view similar to Fig. 1 showing a further modification of the invention.

Figure 5:
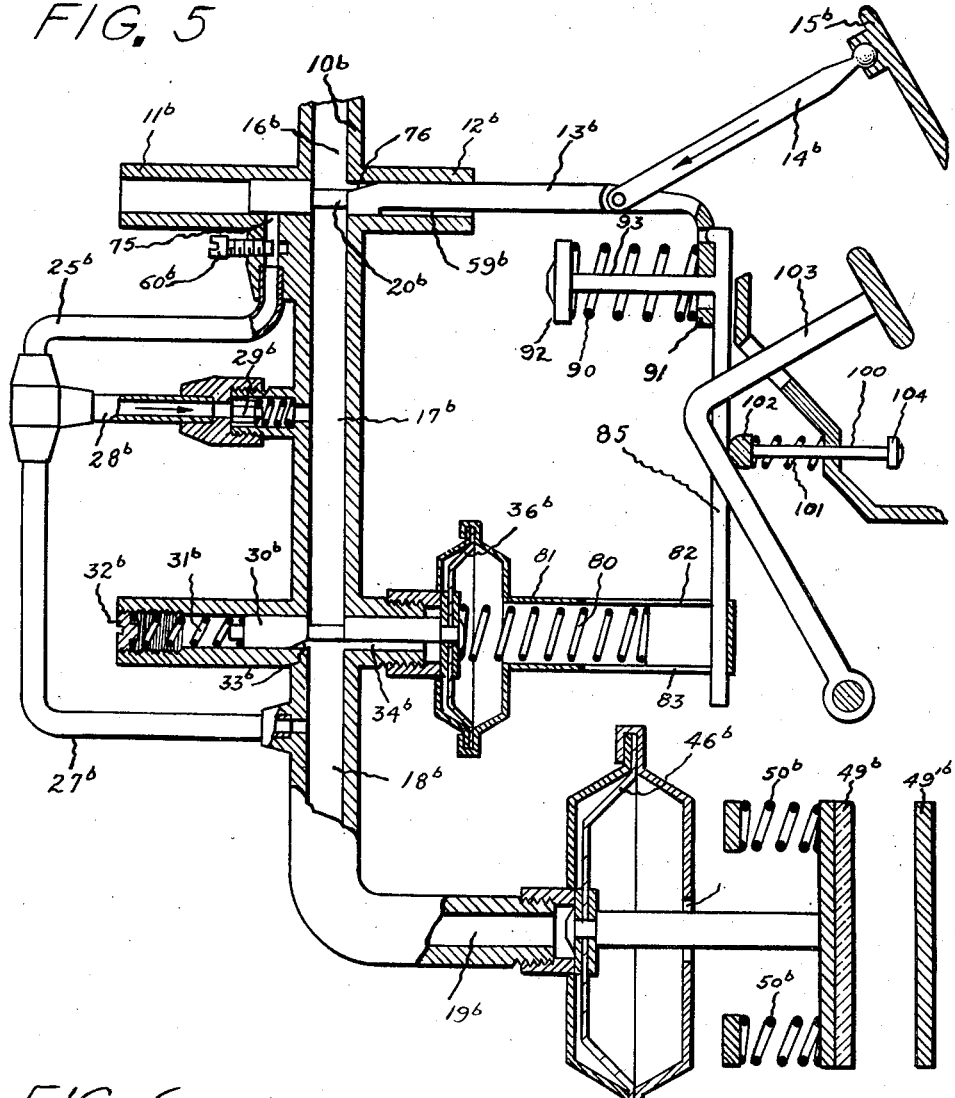
Fig. 5 is a view similar to Fig. 1 showing a slightly modified form of construction.

In general, the invention relates to an automatic control means for a motor vehicle clutch which will make it unnecessary for the driver of the vehicle to depress the clutch pedal when he desires to shift the gears of the transmission from one speed to another or from neutral gear to any position. This automatic control means also provides that the wheels of the vehicle may rotate faster than the motor, with the result that as the motor idles, the vehicle may coast. The invention further provides that this automatic control means may be selectively rendered operative or inoperative at the will of the operator.

In similar prior devices of this general character, it has been the practice to allow the clutch plates to move rapidly toward contacting positions and to arrest this motion just before the plates contact by means which controls the opening through which the air passes that provides for the motion of the clutch plates. This has required an accurate control over the dimensions and assembly of a number of parts to insure that this cutoff or control operates at the proper instant for correct clutch action. Further, when the clutch plate lining wears, it becomes necessary in structures of this character to make the proper adjustments in order to secure the proper clutch action.

A further disadvantage of prior constructions has been that after the accelerator is once depressed sufficiently to start the movement of the clutch plates to contacting positions, the motion of the clutch plates will take place to a complete engagement even if the accelerator is held still. In other words, it was substantially impossible with prior constructions to effect a partial declutching of the clutch.

The present invention contemplates the elimination of the above and numerous other disadvantages of the prior constructions by providing first, a control means by which the motion of the clutch plates toward contacting position is arrested by events which occur just as the plates begin to contact to any degree whatever. The invention further provides a diaphragm for controlling the valve, whose function it is to arrest the clutch plate contact, with the result that a substantial force may be imposed on the valve to eliminate danger of the valve sticking, due to the presence of dirt or foreign matter. The invention further provides a control means by which the pressure with which the clutch plates engage each other may be accurately controlled. The arrangement is such that when the accelerator is depressed to a certain position, the control means will allow the plates to come together with some predetermined pressure, but no more, until the accelerator is depressed further when the contact will then be completed, and the rate of completion will increase the further the accelerator is depressed. Further, when the accelerator is released to a certain position, the clutch plate pressure will be reduced again, thus providing for a partial declutching of the clutch.

Referring then particularly to the drawings wherein like reference characters designate corresponding parts throughout all views, there is shown in Figs. 1 to 3, inclusive, a system which comprises a conduit 10 which is adapted to be connected to the intake manifold (not shown) of the internal combustion engine of the vehicle with which the system is associated. The conduit 10 is provided with aligned lateral extensions 11 and 12 which slidably receive a plunger 13 connected by suitable linkage 14 to the accelerator pedal 15. The conduit 10 provides a passage which is divided into the sections 16, 17, 18 and 19 by means which will hereinafter be more fully described.

The plunger 13 constitutes in substance a valve which controls communication between passages 16 and 17. For this purpose the plunger 13 is provided with a reduced portion 20 so that when the plunger is in the position shown in Fig. 1 of the drawings, that is, when the accelerator pedal is fully released, the passage 16 is in communication with the passage 17.

Tapped into the passage 16 is a conduit 25 which communicates with a fitting 26 to which is connected a conduit 27, this conduit being in turn tapped into the passage 18. A branch conduit 28 communicating with the fitting 26 and thus with the conduits 25 and 27, communicates with the passage 17 through a check valve 29 designed to permit air to flow only in the direction of the arrow. For controlling communication between passages 17 and 18, there is provided a valve member 30 normally held in the position shown in Fig. 1 of the drawings by a spring 31, the tension of which may be adjusted by a plug 32. The valve member 30 is provided with a cutaway portion 33 to provide communication between passage 18 and passage 34 which communicates with the interior of a diaphragm casing 35. Mounted in this casing is a diaphragm 36 which is exposed in its one face to the pressure in passage 18 and which is exposed in its other face to atmospheric pressure by the ports 37. Fixed to this diaphragm is a stem 38 which is connected to the valve 30, and this stem is provided with a reduced portion 39 for a purpose which will hereinafter be more fully described.

Controlling communication between passages 18 and 19, is a three-way valve designated generally by the reference character 40. This valve provides a passage 41 designed to place the passages 18 and 19 in free communication with each other. This valve is adapted, when rotated 90°, to cut off communication between passages 18 and 19 and to place passage 19 in communication with the atmosphere by way of a passage 42 formed in the valve and a port 43 formed in the conduit 10.

The passage 19 communicates with a casing 45 in which is mounted a diaphragm 46, the diaphragm thus being exposed on its one face to the pressure in passage 19. The opposite face of the diaphragm is exposed to atmospheric pressure by port 47 formed in the casing 45.

The diaphragm 46 is designed to actuate the clutch and for this purpose is provided with a stem 48 suitably arranged to actuate the clutch plates 49 and 49'. Springs 50 normally hold the clutch plates in engagement with each other in accordance with the usual practice.

Tapped into the passage 19 is a conduit 55 which communicates at its other end with the chamber in the extension 12 in which plunger 13 is slidably mounted. This chamber is designated by the reference character 56, and ports 57 and 58 formed in the extension 12 provide communication between this chamber and the atmosphere for a purpose which will hereinafter be more fully described.

The plunger 13 is provided with a cutaway portion 59 designed to provide communication between port 58 and passage 17 upon a predetermined longitudinal movement of the plunger. Further disposed in the nipple to which the conduit 25 is connected is a set screw 60 providing means for restricting the passage through conduit 25 and thus communication between passages 16 and 18 by way of conduits 25 and 27.

In the operation of the system and before the motor is started, the parts assume the position shown in Fig. 1 of the drawings. By reference to this figure, it will be noted that passage 16 is in communication with passage 17, but that direct communication between passages 17 and 18 is prevented by valve 30. Passages 16 and 17 are also in communication with passage 18 by conduits 25, 27 and 28.

If now, the motor is started, vacuum is created in passage 16, and this in turn is transmitted to passage 17 by virtue of the reduced portion 20 of plunger 13. Since passages 16 and 17 are in communication with passage 18 by way of conduits 25, 27 and 28 and check valve 29, vacuum is created in passage 18, causing diaphragm 36 to move valve 30 to the position shown in Fig. 2 of the drawings against the action of spring 31. This immediately places passage 17 in communication with passages 18 and 19 and moves diaphragm 46 to the position shown in Fig. 2 of the drawings, thus completely releasing the clutch. It is to be understood that the passage through conduits 25 and 27 and restriction 60 is of less capacity than the passage through conduits 27 and 28 and check valve 29.

With the motor idling and the clutch disengaged, it will be obvious that the gears may be shifted as desired. If now, the accelerator pedal is depressed, plunger 13 is moved to first place passage 17 in communication with the atmosphere by way of cutaway portion 59 in the plunger and port 58 in the extension 12, as shown in Fig. 3. This takes place at approximately the same time that the motor begins to accelerate, by virtue of the linkage 14 which suitably connects the accelerator pedal and the plunger 13. As groove 59 begins to register with passage 17, atmosphere is allowed to enter passage 17 through port 58, and this begins to happen at approximately the same time that plunger 13 cuts off communication between passages 16 and 17. As atmospheric pressure is admitted to passage 17, it passes valve 30 by virtue of the reduced portion 39 and enters passages 18 and 19, thus acting on diaphragm 46. This begins to equalize the atmospheric pressure on this diaphragm, but by virtue of clutch springs 24 acting to engage the clutch plates, a partial vacuum will be maintained in passages 19 and 18. This occurs because the clutch springs 24 acting on diaphragm 46 are strong enough to develop vacuum sufficient to overcome the tendency of spring 31 to close valve 30.

As soon, however, as the clutch plates begin to contact, the pull of springs 50 on diaphragm 46 will decrease, producing a corresponding drop in vacuum in passages 19 and 18. This drop in vacuum will be communicated to diaphragm 36 by virtue of passage 34. When this vacuum has dropped to some predetermined figure which will bear a definite relation to the pressure of contact of the clutch plates, spring 31, which is adjustable in its pressure on valve 30 by plug 32, will overcome air pressure acting on diaphragm 36 and cause valve 30 to close. Thus it will be apparent that this drop in vacuum is of great importance and is one of the features of the control system, as it is this phenomenon that is taken advantage of to allow a rapid motion of the clutch plates toward contact until they become actually contacted to some degree. It will be apparent that valve 30 can be set to close at any degree of pressure between the clutch plates and that after this valve closes, further contact of the clutch plates must be accomplished by some other means.

The vacuum in passage 16 is constantly in communication with passage 18 through the adjustable restriction 60 and conduits 25 and 27. Due, however, to the restriction 60, the volume of air drawn through this path is too small to interfere with the closing of valve 30. After the valve 30 has closed, however, the effect of the suction through conduits 25 and 27 is to offset leakage and insure no further contact of the clutch plates until further motion of the accelerator takes place. Thus the clutch plates will not be in complete engagement with each other until the accelerator is further depressed.

At approximately the time that plunger 13 places port 58 in communication with passage 17, a taper 61 formed on the plunger 13 begins to place conduit 55 in communication with the atmosphere by virtue of port 57. This delivers atmospheric pressure to casing 45 and thus tends to further engage the clutch plates. Opposing this is the suction acting through the adjustable restriction 60 and the conduits 25 and 27.

As the accelerator is depressed, more air is admitted to conduit 55 through port 57 because of the taper 61 on the plunger. It is apparent that conduit 55 can be made to deliver air to the diaphragm faster than air is taken away through the adjustable restriction 60 at any predetermined position of the accelerator. Thus the clutch plates will completely engage only after this point has been reached and passed, and the nature and speed of the engagement can be controlled by the proper shape and size of taper 61 and the proper degree of restriction 60. To regulate the quantity of air drawn in through port 57, this port may conveniently be provided with an adjustable restriction 63. It will be obvious that if at any point during the contacting of the clutch plates, the accelerator pedal is moved back toward idle by the driver, the pressure between the clutch plates will be decreased, since the delivery of air through conduit 55 will decrease and can be made less than the rate at which air is exhausted through restriction 60. Thus adjustable restriction 60 and adjustable spring 31 provide convenient and practical means for adjusting the action of the clutch.

It is not essential that the taper 61 be a straight line taper or of any fixed shape. This taper, together with the restricting means 60 and spring 31 as well as all valves and conduits, must be balanced and proportioned to secure the best all-around performance and will vary in various types of vehicles and clutches. It is important, however, that a taper of some kind be provided which will give a rapid contact of the clutch plates when the accelerator is depressed rapidly and a slower contact when the accelerator is depressed slowly.

The valve 40 constitutes a means for rendering the automatic control means operative or inoperative. Control rod 62 connected to this valve is designed to be accessible to the driver, thus permitting the driver to rotate the valve through 90° to thus close communication between passages 18 and 19 and place passage 19 in communication with the atmosphere. This will prevent the transmission of vacuum to the passage 19 and will expose both faces of diaphragm 46 to the atmosphere.

It will be noted that during the normal operation of the car when the accelerator is depressed, air will be drawn into passage 16 and thus into the intake manifold through conduits 25 and 27. It has been demonstrated, however, that this quantity of air will be so small as not to disturb the carburetion of the motor.

In Fig. 4 there is diagrammatically illustrated a manner in which an independent control may be associated with the plunger 13 to render the control system operative or inoperative. Referring to this figure, the plunger 13ᵃ is shown as being normally held in engagement with, but free from connection to the accelerator pedal 15ᵃ by a spring 65. Thus in normal operation, depression of the accelerator pedal will effect an actuation of the plunger the same as above described.

Pivotally mounted on a suitable support, however, is a lever 66 to one end of which is secured an actuating handle 67. The other end of this lever is arranged to engage a collar 68 on the plunger 13ᵃ. The actuating handle is provided with a notch 69 which when engaged with the portion of the support which defines a slot through which the actuating handle passes, will hold the handle and lever in such a position that the plunger 13a will be forced inwardly sufficiently to bring the taper thereon into operation and to close off passage 17a from the vacuum in passage 16a. Thus the clutch actuating diaphragm will be exposed on both sides to atmospheric pressure by air passing around the tapered portion of the plunger, and while air will be withdrawn from the diaphragm casing through the restricted passage previously described, this will be insufficient to actuate the clutch actuating diaphragm and also insufficient to effect the carburetion of the motor.

In Fig. 5 a slightly modified form of construction is disclosed in which conduit 10ᵇ provides passage 16ᵇ which communicates with the intake manifold which furnishes the vacuum necessary to operate the system. The position of all parts is shown as they are while the motor idles, the accelerator being released and vacuum being present in passage 16ᵇ.

Passage 16ᵇ is open through reduced portion 20ᵇ of the plunger 13ᵇ to passage 17ᵇ. Valve 30ᵇ is opened to the position shown, by the action of the vacuum acting through check valve 29ᵇ through conduit 27ᵇ, passage 18ᵇ, taper 33ᵇ and groove or passage 34ᵇ to diaphragm 36ᵇ. The vacuum acting on diaphragm 36ᵇ overcomes spring 31ᵇ and moves valve 30ᵇ to the position shown. This provides direct communication between passage 17ᵇ and passage 19ᵇ so that the suction acts on diaphragm 46ᵇ to complete the clutch disengagement.

The linkage to accelerator 15ᵇ is so arranged that plunger 13ᵇ moves forward in the direction of the arrow approximately enough to allow atmosphere to enter passage 17ᵇ through groove 59ᵇ before the throttle valve of the carburetor is affected. At approximately the same time that the motor begins to speed up and air begins to enter passage 17ᵇ through groove 59ᵇ, plunger 13ᵇ uncovers port 75 formed in extension 11ᵇ and vacuum from passage 16ᵇ acts through adjustable restriction 60ᵇ, conduits 25ᵇ and 27ᵇ, and passage 18ᵇ. The capacity of this path is small, however, due to its size and restriction 60ᵇ. At approximately the same time that air begins to enter passage 17ᵇ through groove 59ᵇ, plunger 13ᵇ closes communication between passages 16ᵇ and 17ᵇ, thus cutting off the vacuum from passage 17ᵇ. As atmosphere is admitted to passage 17ᵇ, it passes through valve 30ᵇ which is still approximately in the position shown. The atmosphere passes through passage 18ᵇ and 19ᵇ to diaphragm 46ᵇ, thus partially equalizing the pressures acting on this diaphragm.

Due, however, to the action of the clutch springs 50ᵇ, a partial vacuum will be maintained in passages 19ᵇ, 18ᵇ and 34ᵇ, while the clutch springs carry the clutch plates toward engagement. When the clutch plates begin to contact, however, the pull of the springs 50ᵇ on the diaphragm 46ᵇ must decrease, and a corresponding drop in vacuum in passages 19ᵇ, 18ᵇ and 34ᵇ will occur. As in the first described form of construction, spring 31ᵇ acting on valve 30ᵇ, is adjusted by plug 32ᵇ to close valve 30ᵇ at some predetermined clutch plate pressure. The plunger 13ᵇ is tapered as at 76 so that suction may act through this taper, the passage provided by reduced portion 20ᵇ, adjustable restriction 60ᵇ and conduits 25ᵇ and 27ᵇ to offset leakage and to prevent further contact of the clutch plates until the accelerator is depressed further.

As thus far described, the action of this form of construction is quite similar to the previously described system. In this form of construction, however, there is also provided a spring 80 which is mounted in a tubular housing 81 and which is so arranged that its one end engages one face of the diaphragm 36ᵇ, while its other end is normally free. The housing 81 is provided with slots 83 through which air may enter to act on the diaphragm 36ᵇ.

The slots 83 extend to the outer end of the housing 81, and an arm 85 slidably mounted in these slots is adapted to be moved forwardly to engage the free end of the spring 80 to compress the same and to thus increase the force exerted by this spring on the diaphragm 36ᵇ. It will be noted that spring 80, when engaged by arm 85, acts on diaphragm 36ᵇ in opposition to the force exerted on this diaphragm by spring 31ᵇ.

Arm 85 is fixed for movement with plunger 13ᵇ and is so arranged that the pressure applied on the accelerator pedal begins to be transmitted to spring 80 and diaphragm 36ᵇ at approximately the time that valve 30ᵇ closes communication between passages 17ᵇ and 18ᵇ. Thus the equilibrium set up between spring 31ᵇ and the vacuum in passage 18ᵇ acting on diaphragm 36ᵇ is overcome, and valve 30ᵇ will be moved against spring 31ᵇ enough to allow more air to enter passages 18ᵇ and 19ᵇ from passage 17ᵇ.

This will result in a further drop in the vacuum acting in passages 18ᵇ and 19ᵇ and thus allow a further contact of the clutch plates. This decrease of vacuum which will also be present in passage 34ᵇ, due to the weakening of clutch springs 50ᵇ in their pull on diaphragm 46ᵇ, will allow spring 31ᵇ to again overcome the force of vacuum on diaphragm 36ᵇ and again shut off the atmosphere present in passage 17ᵇ from entering passage 18ᵇ. Thus the pressure of contact of the clutch plates will increase as the accelerator pedal is depressed, and the clutch plate pressure will cease to increase when motion of the accelerator pedal is stopped. Also, due to the action of vacuum through the adjustable restriction 60ᵇ and conduits 25ᵇ and 27ᵇ, the clutch plate pressure can be decreased by degrees by partly releasing the accelerator pedal. The taper 76 in the plunger 13ᵇ provides communication between conduit 25ᵇ and passage 16ᵇ during the time that clutch plate contact is being made.

A further object of the taper 76 shown in Fig. 5 is to provide a suction connection between the diaphragm 46ᵇ and the intake system of variable capacity, and one that decreases in capacity as the accelerator pedal 15ᵇ is depressed and increases as the accelerator pedal 15ᵇ is released. The above action obviously takes place during the initial movement of accelerator pedal 15ᵇ while taper 76 is in register with passage 10ᵇ.

The effect of the variable suction connection referred to above is to assist in controlling the clutch plate pressure during the period of the motion of accelerator pedal 15ᵇ that clutch plate contact is being made. Adjustable restriction 60ᵇ can be set to give the conduits 27ᵇ and 25ᵇ any desired capacity. Then, as the accelerator pedal 15ᵇ is depressed, the quantity of air removed by suction will decrease due to taper 76, and hence the quantity of air necessary to move thru groove 59ᵇ, passage 17ᵇ, and past valve 30ᵇ to diaphragm 46ᵇ in order to increase the clutch plate pressure, will decrease. Also a partial release of the accelerator pedal 15ᵇ will at once increase the capacity of the above suction connection, and hence rapidly decrease the clutch plate pressure, since the release of the accelerator pedal also decreases the tension in spring 80.

It will be apparent that full clutch plate contact will be obtained when the pressure from the accelerator pedal acting through arm 85 on spring 80 is equal to the pressure of spring 31ᵇ when valve 30ᵇ just allows air to pass from passage 17ᵇ to passage 18ᵇ.

The arm 85 is yieldably arranged to move with the plunger 13ᵇ by a spring 90 which engages at its one end an abutment 91 on the plunger 13ᵇ and engages at its other end a head 92 on a stem 93 which is fixed to the arm. The arrangement of the spring 90 is such that arm 85 moves forward with plunger 13ᵇ as a unit and acts as though rigidly connected to the same until a certain predetermined point is reached. Spring 90 is of such strength, however, that it does not compress at the stress in arm 85 required to obtain a complete engagement of the clutch. As the accelerator is depressed further, however, as in the normal operation of the car, the additional stress in arm 85, as it further compresses spring 80, will also compress spring 90. The proper design of springs 80 and 90 will allow the accelerator pedal to be depressed to its maximum limit without undue force.

It is obvious that various other means may be employed to allow arm 85 to exert the required force on spring 80 as the accelerator pedal is only slightly depressed and to exert no more or very little more than this force on the spring 80 during the remainder of its motion. This is desirable to secure easier operation of the accelerator pedal during the latter portion of its range.

In this form of construction, a modified form of control for rendering the clutch control means operative or inoperative, is also provided. This means comprises a plunger 100 acted upon by a spring 101 to urge the head 102 of the plunger into engagement with clutch pedal 103 and arm 85. Whenever the clutch pedal is not depressed, the clutch pedal return springs (not shown, overcome spring 101 to maintain the plunger in the position shown in Fig. 5. All clutch pedals are adjusted to have a certain amount of downward motion, usually from one to two inches, before the clutch plates are affected, and plunger 100 is so arranged that as soon as clutch pedal 103 is depressed slightly, spring 101 can act on the plunger to move arm 85 and thus plunger 13$^b$ forwardly sufficiently to close communication between passages 16$^b$ and 17$^b$ and to thus cut off the vacuum from passage 17$^b$ and at the same time to place passage 17$^b$ in communication with the atmosphere by way of passage 59$^b$. Although this motion carries the accelerator pedal downwardly, it does not carry it past the point where the throttle valve of the carburetor is affected, the movement being sufficient to carry the accelerator just to this point. Plunger 100 is then stopped by collar 104, and the clutch can be disengaged manually, the gears of the transmission shifted, and clutch engagement made manually, since pedal 103 does not contact the head of the plunger until after full release of the clutch is made. When the driver's foot is entirely removed from the clutch pedal, it will return to the position shown in Fig. 5, and whether or not vacuum will operate the clutch will depend upon the position of the accelerator.

Figure 6:
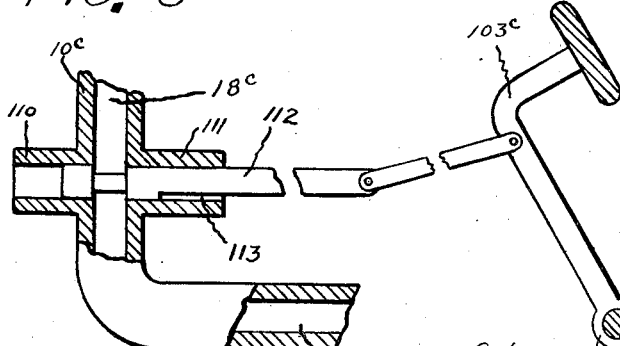
Fig. 6 is a fragmentary semi-diagrammatic view in section showing a clutch pedal control partly in section for rendering the clutch controlling means inoperative.

In Fig. 6 a modified method of control for the clutch control means is illustrated, and by reference to this figure it will be noted that there is formed in the conduit 10$^c$ branches 110 and 111 which open into the passage 18$^c$. A valve 112 is inserted in these extensions, and this valve is directly connected to the clutch pedal 103$^c$. The initial downward motion of the clutch pedal before the clutch plates are affected will close passage 18$^c$ from passage 19$^c$ which leads to the main clutch diaphragm (not shown). It also places passage 19$^c$ in communication with the atmosphere through a groove 113 formed in the plunger 112. Thus the automatic clutch control is completely cut out, and the clutch may be disenengaged and engaged, as described with reference to Fig. 5.

In Fig. 7 a modified control system is disclosed in which connections to the carburetor riser around the throttle valve are used to control the system. The position of all parts is shown as they are while the motor idles, it being understood that passage 16$^d$ is connected to the intake manifold to supply the vacuum necessary to operate the system. Formed in the carburetor riser 125 is a port 126 into which is tapped a conduit 127. When the motor idles, vacuum acts through port 126 on diaphragm 128 which is connected to plunger 13$^d$. The vacuum acting on diaphragm 128 overcomes spring 129 and allows atmospheric pressure acting on the diaphragm through ports 130 to move the plunger 13$^d$ to a position where passage 16$^d$ is in communication with passage 17$^d$. Valve 30$^d$ at first closes passage 17$^d$ from passage 18$^d$, but vacuum acting through one-way check valve 29$^d$ and conduit 27$^d$, passage 18$^d$ and taper 33$^d$, acts on diaphragm 36$^d$ to move valve 30$^d$ to the position shown. Then a direct path is open from passage 16$^d$ to passage 19$^d$, and the clutch is completely disengaged by virtue of atmospheric pressure acting on diaphragm 46$^d$ through openings 47$^d$.

The carburetor throttle valve is so arranged that as it is opened, it first passes port 126 without greatly affecting the motor speed. As soon as the throttle valve does pass this port, near atmospheric pressure acts through port 126, and spring 129 at once moves plunger 13$^d$ to close communication between passages 16$^d$ and 17$^d$, allowing atmosphere to enter passage 17$^d$ through ports 130 and passage 131 in the plunger. Air then passes valve 30$^d$ and enters passage 18$^d$ and allows the clutch springs to move the clutch plates toward engagement. The action of the clutch springs on diaphragm 46$^d$ will maintain a partial vacuum in the passages 19$^d$, 18$^d$ and groove 34$^d$. When the partial engagement of the clutch plates reduces the pull of the clutch springs on diaphragm 46$^d$, a drop in vacuum will occur in these passages, permitting spring 31$^d$ to close valve 30$^d$. Thus spring 31$^d$ can be set to close off the incoming air from passage 17$^d$ at any predetermined clutch plate pressure. Further engagement of the clutch plates is effected only after the carburetor valve is opened further.

A plurality of ports 135 are formed in the carburetor riser and act through adjustable restriction 60$^d$ and conduit 136 to offset leakage in the control system, thus insuring no further engagement of the clutch plates until the throttle valve is moved further. This suction at passage 18$^d$ also makes it possible for the operator of the car during the period of engagement of the clutch to reduce the pressure of contact of the clutch plates by releasing the accelerator slightly. This is true because releasing the accelerator after engagement of the clutch plates has passed the first stage, will increase the suction in conduit 136, thus tending to bring the clutch plate pressure back to the first stage determined by the adjustment of spring 31$^d$.

As the throttle valve is moved further toward open position, the vacuum acting through ports 135 decreases and also as the throttle valve passes each port, this port is subject to near-atmospheric pressure. Thus the drop in vacuum in conduit 136 is produced both by the general drop in vacuum in the carburetor riser as the throttle is opened and also by the local conditions around the edge of the throttle valve. Thus, when the throttle valve moves further, the clutch plate pressure increases and when the throttle valve stops, the clutch plate pressure will remain constant.

At any predetermined movement of the throttle valve, full clutch engagement can be secured, and the nature of the clutch engagement can be controlled by adjustable restriction 60$^d$ and adjustable spring 31$^d$.

Free wheeling control, or control of the automatic clutch control means, is secured by valve 40$^d$ which is mounted in the conduit 127. When this valve is rotated 90°, port 126 is shut off from communication with diaphragm 128, and this diaphragm is placed in communication with the atmosphere by way of port 43$^d$. Thus spring 129 moves plunger 13$^d$ to shut off the vacuum from passage 16$^d$ and to place passage 17$^d$ in communication with the atmosphere.

The system disclosed in Fig. 8 is similar in many respects to the system disclosed in Fig. 7. The intake manifold is connected to passage 16e, and all parts are shown in the positions they occupy as the motor idles. The vacuum in the carburetor riser 125e acts through port 126e through the valve 40e and conduit 127e on diaphragm 128e. Atmospheric pressure acting on this diaphragm then overcomes spring 129e and moves the plunger 13e to the position shown. This allows vacuum to act past the plunger to passage 17e. Valve 30e at this time closes passage 17e from passage 18e, but the vacuum in passage 17e can act through one-way check valve 29e and passage 27e on diaphragm 36e. This moves valve 30e to the position shown so that vacuum may act directly through passages 17e and 18e on diaphragm 46e, thus completely disengaging the clutch plates.

As soon as the throttle valve is rotated past the port 126e, this port is subjected to near-atmospheric pressure. Spring 129e will then move plunger 13e to cut off communication between passages 16e and 17e and to place passage 17e in communication with the atmosphere. As air passes through passage 17e and past valve 30e into passage 18e, the clutch springs will move the clutch plates toward engagement. A partial vacuum, however, will be maintained in these passages due to the action of the clutch springs, but as soon as the clutch plates make partial engagement, the pull of the clutch springs on diaphragm 46e will decrease, and this will cause a corresponding drop in the vacuum acting on diaphragm 36e. Thus spring 31e may be set to close valve 30e at any predetermined clutch plate pressure, shutting off atmosphere from passage 17e to passage 18e. Suction will then act through adjustable restriction 60e and conduit 136e and passage 18e to offset leakage and prevent further contacting of the clutch plates until the throttle valve is opened further.

At this time, vacuum acting through conduit 150 on diaphragm 151 is approximately equal in force to spring 152 so that the two forces now balance each other. However, as the vacuum in conduit 150 drops as the accelerator valve is opened, spring 152 begins to exert a push on valve 30e. This then allows more air to pass from passage 17e to passage 18e, and this action will decrease the vacuum acting on diaphragm 46e and allow a greater pressure between the clutch plates. This drop in vacuum will also close valve 30e again, and the clutch plates will engage no further until the throttle valve is opened further. Thus, as the throttle valve is opened, the clutch engages more completely, and if the throttle is closed, the clutch plate pressure will decrease, due to the suction through conduit 136e, and the increase in vacuum in the carburetor riser. Complete engagement of the clutch will occur at some predetermined degree of throttle valve opening when the vacuum acting on diaphragm 151 is so small as to allow spring 152 to overcome spring 31e and hold valve 30e open, allowing the vacuum in passage 18e to to disappear.

The drop in vacuum in conduit 150 as the throttle valve is opened is controlled through the setting of an adjustable restriction 155 in a passage 156 and adjustable restriction 157 in a passage 158. The drop in vacuum at passage 158 is almost wholly due to the change in vacuum around the throttle valve as it is opened and becomes near-atmospheric as soon as the throttle valve passes this passage. The drop in vacuum at passage 156 is due only to the general drop in the carburetor riser as the throttle valve is opened. Thus by proper adjustment of restrictions 155 and 157, the desired change in vacuum in conduit 150 as the throttle is opened, can be obtained.

Free wheeling control, or control of the automatic control means, is obtained by valve 40e which is accessible to the driver and which, when rotated 90°, shuts off the vacuum from diaphragm 128e and places this diaphragm in communication with the atmosphere. This allows spring 129e to move the plunger 13e to a position where vacuum is cut off from passage 17e, and this passage is placed in communication with the atmosphere by way of passage 131e and ports 130e.

In Fig. 9 there is disclosed a system which is quite similar to that disclosed in Figs. 1 to 3, inclusive, but having the advantage that the only connection to the accelerator pedal is a small piston or plunger valve. Further, it is only necessary to connect small conduits to this plunger valve, making it much easier to install on the car. The numeral 165 designates a tubular housing for receiving the plunger 13f which is connected to the accelerator 15f by the linkage 14f. Tapped into the conduit 165 is a conduit 166 which is connected to the intake manifold as is also the passage 16f. As soon as the accelerator pedal is depressed, plunger 13f moves to close communication between conduit 166 and conduit 167, thus shutting off the vacuum in conduit 167. This conduit is at this time also placed in communication with the atmosphere by passage 168 in plunger 13f and port 169 in conduit 165. This allows spring 170 to move diaphragm 128f and valve 171 to close communication between passages 16f and 17f and to allow atmospheric pressure to enter passage 17f through ports 130f and groove 172 in valve 171.

Air then passes through passage 17f past valve 30f into passages 18f and 19f, allowing the clutch springs 50f to move the clutch plates 49f and 49'f toward contact. The clutch springs, however, will maintain a partial vacuum in passages 19f and 18f and groove 34f in valve 30f and on diaphragm 36f. As soon as the clutch plates contact in any degree, the pull of the clutch springs on diaphragm 46f will decrease, causing a drop in vacuum in the passages leading to diaphragm 36f, at which time spring 31f may close valve 30f, thus cutting off the supply of air to passage 18f.

Vacuum still acts through adjustable restriction 60f and conduits 25f and 27f to offset leakage and maintain this degree of vacuum in passages 18f and 19f, thus insuring no further contact of the clutch plates until the accelerator is moved further. When the accelerator is further depressed, taper 61f allows air to enter conduit 55f from port 57f. When this delivery of air becomes greater than the quantity of air removed through adjustable restriction 60f, the clutch plates will begin to further contact.

The function of check valve 29f is to provide a connection between the passages 18f and 17f in one direction only, so that no air can enter passage 18f thru check valve 29f, but air can be removed from passage 18f thru conduit 27f and check valve 29f when the pressure in passage 17f is lower than the pressure in passage 18f. Thus when the accelerator pedal is released, vacuum will again be transferred to diaphragm 128f thru conduits 166 and 167. Atmospheric pressure acting on diaphragm 128f thru ports 130f will overcome spring 170 and place valve 171 in the position shown in Fig. 9. Then vacuum will exist in passage 17$^f$, and the purpose of check valve 29$^f$ is to provide means of evacuating the passage 18$^f$. This is necessary, since the valve 30$^f$ is closed and will remain closed until enough vacuum exists in passage 18$^f$ to allow atmospheric pressure acting thru port 37$^f$ on diaphragm 36$^f$ to overcome spring 31$^f$ and place valve 30$^f$ in the position shown in Fig. 9. Then direct communication will be provided between the intake system and the clutch actuating diaphragm 46$^f$ whereby the clutch will be completely released by the action of atmospheric pressure thru port 47$^f$.

The function of check valve 29$^f$ is precisely the same as the function of check valve 29 in Figs. 1, 2 and 3, and the operating characteristics of this system are the same. It will be apparent, however, that this system may be more readily installed in a vehicle.

From the above it will be apparent that the invention provides a system for automatically controlling the engagement and disengagement of a clutch. The system provides for the arresting of the motion of the clutch plates toward contact when they first begin to contact, this being obtained by the utilization of the drop in vacuum taking place at the time the clutch begins to contact. The clutch plates may be partially disengaged and the pressure of engagement thereof varied, in dependence upon the actuation of the accelerator, throttle valve or like mechanism for controlling the acceleration of the motor.

Such control of the clutch plate pressure in relation to the position of the accelerator pedal is obtained in the system illustrated in Figures 1, 2 and 3, by the use of a constant suction from the clutch actuating diaphragm and a variable air inlet to said diaphragm, thus providing a variable change in the ratio of air exhaust and inlet capacities to and from said diaphragm dependent on the motion of the accelerator pedal.

The system illustrated in Fig. 5 provides the same control over the ratio of air exhaust and in'et by the use of a variable suction connection to the clutch actuating diaphragm which decreases in capacity as the accelerator is depressed, and a variable air inlet which increases as the accelerator is depresed.

The same action is obtained in the system illustrated in Fig. 7 by the change in ratio of the area of ports 135 exposed to atmosphere and to vacuum as the carburetor throttle valve is moved.

The system illustrated in Fig. 8 provides the same change of ratio of air exhausted from the clutch operating diaphragm and air inlet to said diaphragm as the accelerator is depressed, or released within the maneuvering range of the accelerator pedal.

Each of the above systems make the pressure in the clutch actuating diaphragm chamber dependent on the position of the accelerator pedal. In this connection it should be pointed out that the flow of air between the clutch actuating diaphragm and the atmosphere, and between said diaphragm and the intake system, depends on the size or capacity of the above connections, and the difference in pressure that exists. Therefore, for any given setting of the accelerator pedal the rate of air inlet to the clutch actuating diaphragm must decrease since the difference in pressure causing motion of air is decreasing as the clutch plates engage more completely. This is true because the pull of the clutch springs on the diaphragm decreases as the clutch plates engage. Also the quantity of air removed by the suction must increase as the pressure in the clutch actuating diaphragm increases. Thus it is apparent that a point of equilibrium in the clutch actuating diaphragm will be reached for any setting of the ratio of air inlet and exhaust capacities to the clutch actuating diaphragm.

The invention provides a one-way check valve to allow suction to by-pass the diaphragm control valve which stops the motion of the clutch plates to contacting position and thus allows the suction to actuate the main clutch actuating diaphragm and the diaphragm of the control valve at the proper time. The invention provides means for rendering the automatic clutch control means operative or inoperative, either automatically or at the will of the operator.

While the invention has been described with some detail, it is to be understood that the description is for the purposes of illustration only and is not to be construed as definitive of the limits of the inventive idea. The right is reserved to make such changes in the details of construction and arrangement of parts as will fall within the purview of the attached claims.

What I claim as my invention is:

1. In an automatic control means for the clutch of a motor vehicle, the combination with a mechanism for controlling the acceleration of the motor, of means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, means operating when the motor is idling to actuate the main and auxiliary valve to provide direct communication between the intake manifold and the said member to release said clutch, means operating upon actuation of said acceleration control mechanism to actuate said main valve to close the passage to the intake manifold and open the passage to the atmosphere whereby the clutch is moved toward engaged position, means operating upon partial engagement of said clutch to close said auxiliary valve and means further modifying the pressure acting on said said member responsive to suction whereby clutch engagement is completed.

2. In an automatic control means for the clutch of a motor vehicle, means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, means operating when the motor is idling to actuate the main and auxiliary valve to provide direct communication between the intake manifold and the said member to release said clutch, means operating in timed relation to the acceleration of the motor to actuate said main valve to close the passage to the intake manifold and open the passage to the atmosphere whereby the clutch is moved toward engaged position, means operating upon partial engagement of said clutch to close said auxiliary valve, and means providing an auxiliary passage communicating with the intake manifold and with said first mentioned passage between said auxiliary valve and the member, for admitting suction to said passage adjacent said member to arrest motion of the clutch toward engaged position when said auxiliary valve is closed.

3. In an automatic control means for the clutch of a motor vehicle, the combination with a mechanism for controlling the acceleration of the motor, of means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, means operating when the motor is idling to actuate the main and auxiliary valve to provide direct communication between the intake manifold and the said member to release said clutch, means operating upon actuation of said acceleration control mechanism to actuate said main valve to close the passage to the intake manifold and open the passage to the atmosphere whereby the clutch is moved toward engaged position, means responsive to the drop in vacuum in said passage incident to a partial engagement of said clutch to close said auxiliary valve to arrest motion of the clutch toward engaged position and means further modifying the pressure acting on said member responsive to suction whereby clutch engagement is completed.

4. In an automatic control means for the clutch of a motor vehicle, the combination with a mechanism for controlling the acceleration of the motor, of means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, means operating when the motor is idling to actuate the main and auxiliary valves to provide direct communication between the intake manifold and the said member to release said clutch, means operating upon actuation of said acceleration control mechanism to actuate said main valve to close the passage to the intake manifold and open the passage to the atmosphere whereby the clutch is moved toward engaged position, means operating upon partial engagement of said clutch to close said auxiliary valve, means providing an auxiliary passage communicating with the intake manifold and with said first mentioned passage between said auxiliary valve and the member, for admitting suction to said passage adjacent said member to arrest motion of the clutch toward engaged position when said auxiliary valve is closed, and adjustable means for restricting said auxiliary passage.

5. In an automatic control means for the clutch of a motor vehicle, means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, resilient means for holding said auxiliary valve closed, a pressure responsive member exposed to the pressure in the passage beyond said auxiliary valve for moving said auxiliary valve to open position, means operable when said motor is idling to open said main valve to provide communication between said passage and the intake manifold, and a one-way by-pass around said auxiliary valve for transmitting the suction in advance of said auxiliary valve to the portion of the passage beyond the auxiliary valve to actuate the pressure responsive member connected to the auxiliary valve to open the latter and thus provide direct communication between the intake manifold and the said first mentioned member whereby said clutch is moved toward released position.

6. In an automatic control means for the clutch of a motor vehicle, means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, resilient means for holding said auxiliary valve closed, a pressure responsive member exposed to the pressure in the passage beyond said auxiliary valve for moving said auxiliary valve to open position, means operable when said motor is idling to open said main valve to provide communication between said passage and the intake manifold, a one-way by-pass around said auxiliary valve for transmitting the suction in the passage in advance of said auxiliary valve to the portion of the passage beyond the auxiliary valve to actuate the pressure responsive member connected to the auxiliary valve to open the latter and thus provide direct communication between the intake manifold and the said first mentioned member whereby said clutch is moved toward released position, and means operating when the motor is accelerated to actuate said main valve to close communication between said passage and the intake manifold and to open communication between the passage and the atmosphere, the resilient means associated with said auxiliary valve acting to close said auxiliary valve upon a predetermined drop in the vacuum in said passage beyond the auxiliary valve incident to a partial engagement of the clutch.

7. In an automatic control means for the clutch of a motor vehicle, means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, resilient means for holding said auxiliary valve closed, a pressure responsive member exposed to the pressure in the passage beyond said auxiliary valve for moving said auxiliary valve to open position, means operable when said motor is idling to open said main valve to provide communication between said passage and the intake manifold, a one-way by-pass around said auxiliary valve for transmitting the suction in the passage in advance of said auxiliary valve to the portion of the passage beyond the auxiliary valve to actuate the pressure responsive member connected to the auxiliary valve to open the latter and thus provide direct communication between the intake manifold and the said first mentioned member whereby said clutch is moved toward released position, means operating when the motor is accelerated to actuate said main valve to close communication between said passage and the intake manifold and to open communication between the passage and the atmosphere, the resilient means associated with said auxiliary valve acting to close said auxiliary valve upon a predetermined drop in the vacuum in said passage beyond the auxiliary valve incident to a partial engagement of the clutch, and means providing an auxiliary passage communicating with the intake manifold and with the main passage between the auxiliary valve and the clutch actuating member for transmitting suction to this portion of the main passage to arrest motion of the clutch toward engaged position when the auxiliary valve is closed.

8. In an automatic control means for the clutch of a motor vehicle, means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, resilient means for holding said auxiliary valve closed, a pressure responsive member exposed to the pressure in the passage beyond said auxiliary valve for moving said auxiliary valve to open position, means operable when said motor is idling to open said main valve to provide communication between said passage and the intake manifold, a one-way by-pass around said auxiliary valve for transmitting the suction in the passage in advance of said auxiliary valve to the portion of the passage beyond the auxiliary valve to actuate the pressure responsive member connected to the auxiliary valve to open the latter and thus provide direct communication between the intake manifold and the said first mentioned member whereby said clutch is moved toward released position, means operating when the motor is accelerated to actuate said main valve to close communication between said passage and the intake manifold and to open communication between the passage and the atmosphere, the resilient means associated with said auxiliary valve acting to close said auxiliary valve upon a predetermined drop in the vacuum in said passage beyond the auxiliary valve incident to a partial engagement of the clutch, means providing an auxiliary passage communicating with the intake manifold and with the main passage between the auxiliary valve and the clutch actuating member for transmitting suction to this portion of the main passage to arrest motion of the clutch toward engaged position when the auxiliary valve is closed, and means operating to admit increasing amounts of air to said main passage adjacent said clutch actuating member as said motor is increasingly accelerated whereby the pressure of engagement of the clutch is increased as the motor is accelerated.

9. In an automatic control means for the clutch of a motor vehicle, means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, resilient means for holding said auxiliary valve closed, a pressure responsive member exposed to the pressure in the passage beyond said auxiliary valve for moving said auxiliary valve to open position, means operable when said motor is idling to open said main valve to provide communication between said passage and the intake manifold, a one-way by-pass around said auxiliary valve for transmitting the suction in the passage in advance of said auxiliary valve to the portion of the passage beyond the auxiliary valve to actuate the pressure responsive member connected to the auxiliary valve to open the latter and thus provide direct communication between the intake manifold and the said first mentioned member whereby said clutch is moved toward released position, means operating when the motor is accelerated to actuate said main valve to close communication between said passage and the intake manifold and to open communication between the passage and the atmosphere, the resilient means associated with said auxiliary valve acting to close said auxiliary valve upon a predetermined drop in the vacuum in said passage beyond the auxiliary valve incident to a partial engagement of the clutch, means providing an auxiliary passage communicating with the intake manifold and with the main passage between the auxiliary valve and the clutch actuating member for transmitting suction to this portion of the main passage to arrest motion of the clutch toward engaged position when the auxiliary valve is closed, and a third valve associated with said main passage between said clutch actuating member and said auxiliary passage operable to close communication between said main passage and said auxiliary passage and to open communication between said main passage and the atmosphere to render said system inoperative.

10. In an automatic control means for the clutch of a motor vehicle, the combination with an accelerator pedal for controlling the acceleration of the motor, of means providing a passage connected to the intake manifold of the motor, a member responsive to the suction in said passage for releasing the clutch, a main valve in the passage connected to the accelerator pedal and operable when said accelerator pedal is released to open communication between said main passage and the intake manifold and operable when said accelerator pedal is depressed to close communication between said main passage and the intake manifold and to open communication between said main passage and the atmosphere, an auxiliary valve between said main valve and the said clutch actuating member, means operating when said accelerator pedal is released and said motor is idling to open said auxiliary valve to provide direct communication between said clutch actuating member and the intake manifold whereby the clutch will be released, means operating upon depression of said accelerator pedal and incident to a drop in the vacuum in the passage beyond the auxiliary valve upon partial engagement of the clutch to close said auxiliary valve, means restricting communication between said intake manifold and said main passage beyond said auxiliary valve for arresting motion of said clutch toward engaged position when said auxiliary valve is closed, and means associated with said main valve and operating as said accelerator is depressed to admit increasing amounts of air to said main passage adjacent said clutch actuating member to effect a further motion of said clutch toward engaged position as said accelerator is depressed.

11. In an automatic control means for the clutch of a motor vehicle, the combination with an accelerator pedal for controlling the acceleration of a motor and a clutch pedal for manually actuating the clutch, of means providing a passage connected to the intake manifold of the motor, a member responsive to the suction in said passage for releasing the clutch, means controlled by the acceleration of the motor for controlling communication between said passage and the intake manifold of the motor to thus regulate the degree of vacuum in said passage, and means operated upon manual depression of said clutch pedal to close communication between said passage and the intake manifold and to open communication between said passage and the atmosphere to thus render said automatic control means inoperative.

12. In an automatic control means for the clutch of a motor vehicle, the combination with a carburetor riser having a throttle valve therein, of means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, and pressure actuated means responsive to the position of said throttle valve for actuating said main valve whereby when said motor is idling said main valve will provide communication between said main passage and the intake manifold while when said motor is accelerating said main valve will close communication between said main passage and the intake manifold and open communication between said main passage and the atmosphere, and means operating to open said auxiliary valve when said motor is idling and to close said auxiliary valve upon partial engagement of the clutch.

13. In an automatic control means for the clutch of a motor vehicle, the combination with a carburetor riser having a throttle valve therein, of means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, pressure actuated means responsive to the position of said throttle valve for actuating said main valve whereby when said motor is idling said main valve will provide communication between said main passage and the intake manifold while when said motor is accelerating said main valve will close communication between said main passage and the intake manifold and open communication between said main passage and the atmosphere, and means operating to open said auxiliary valve when said motor is idling and to close said auxiliary valve upon partial engagement of the clutch, and means controlled by movement of said throttle valve for maintaining a slight vacuum in said main passage beyond said auxiliary valve.

14. In an automatic control means for the clutch of a motor vehicle, means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, resilient means for holding said auxiliary valve closed, means for adjusting the pressure exerted by said resilient means on said auxiliary valve, a pressure responsive member exposed to the pressure in the passage beyond said auxiliary valve for moving said auxiliary valve to open position, means operable when said motor is idling to open said main valve to provide communication between said passage and the intake manifold, a one-way by-pass around said auxiliary valve for transmitting the suction in the passage in advance of said auxiliary valve to the portion of the passage beyond the auxiliary valve to actuate the pressure responsive member connected to the auxiliary valve to open the latter and thus provide direct communication between the intake manifold and the said first mentioned member whereby said clutch is moved toward released position, means operating when the motor is accelerated to actuate said main valve to close communication between said passage and the intake manifold and to open communication between the passage and the atmosphere, the resilient means associated with said auxiliary valve acting to close said auxiliary valve upon a predetermined drop in the vacuum in said passage beyond the auxiliary valve incident to a partial engagement of the clutch, means providing an auxiliary passage communicating with the intake manifold and with the main passage between the auxiliary valve and the clutch actuating member for transmitting suction to this portion of the main passage to arrest motion of the clutch toward engaged position when the auxiliary valve is closed, means for adjustably restricting the capacity of said auxiliary passage, and means operating to admit increasing amounts of air to said main passage adjacent said clutch actuating member as said motor is increasingly accelerated whereby the pressure of engagement of the clutch is increased as the motor is accelerated.

15. In an automatic control means for the clutch of a motor vehicle, the combination with a carburetor riser having a throttle valve therein, of means providing a passage connected to the intake manifold of the motor, a member responsive to the suction in said passage for releasing the clutch, a main valve in the passage operable to control communication between said passage and the intake manifold and between said passage and the atmosphere, an auxiliary valve in said passage for closing the passage between said main valve and said member, pressure actuated means responsive to the position of said throttle valve for actuating said main valve whereby when said motor is idling said main valve will provide communication between said main passage and the intake manifold while when said motor is accelerating said main valve will close communication between said main passage and the intake manifold and open communication between said main passage and the atmosphere, and means operating to open said auxiliary valve when said motor is idling and to close said auxiliary valve upon partial engagement of the clutch, means responsive to the suction in said carburetor riser and to the position of said throttle valve for modifying the actuation of said auxiliary valve, and means controlled by movement of said throttle valve for maintaining a slight vacuum in said main passage beyond said auxiliary valve.

16. In an automatic control for the clutch of a motor vehicle, the combination with a mechanism for controlling the acceleration of the motor, of a pressure responsive means for releasing the clutch, means providing a passage between the pressure responsive means and the intake system of the motor, means operating when the motor is idling to open said passage whereby the vacuum from said intake system actuates said pressure responsive means to release said clutch, means operating upon the actuation of said acceleration control mechanism to reduce the vacuum acting on said pressure responsive means whereby said clutch is moved toward engaged position, means restricting the motion of air allowing said clutch to move toward engagement at or near the initial engagement of said clutch, means providing an auxiliary suction connection from said intake system to said pressure responsive means, means providing an auxiliary air inlet connection to said pressure responsive means, and means providing a change in the ratio of the capacities of said auxiliary suction and inlet connections, said ratio changing in value upon the actuation of said acceleration control mechanism.

17. In an automatic control for the clutch of a motor vehicle, the combination with a mechanism for controlling the acceleration of the motor, of a pressure responsive means for releasing the clutch, means providing a passage between the pressure responsive means and the intake system of the motor, means operating when the motor is idling to open said passage whereby the vacuum from said intake system actuates said pressure responsive means to release said clutch, means operating upon the actuation of said acceleration control mechanism to reduce the vacuum acting on said pressure responsive means whereby said clutch is moved toward engaged position, means for arresting the motion of said clutch toward engaged position upon partial engagement of the clutch members, means providing an auxiliary suction connection from said intake system to said pressure responsive means, means providing an auxiliary air inlet connection to said pressure responsive means, and means providing a change in the ratio of the capacities of said auxiliary suction and inlet connections, said ratio changing in value upon the actuation of said acceleration control mechanism.

18. In an automatic control for the clutch of a motor vehicle, the combination with a mechanism for controlling the acceleration of the motor, of a pressure responsive means for releasing the clutch, means providing a passage between the pressure responsive means and the intake system of the motor, means operating when the motor is idling to open said passage whereby the vacuum from the intake system actuates said pressure responsive means to release said clutch, means operating upon the actuation of said acceleration control mechanism to reduce the vacuum acting on said pressure responsive means whereby said clutch is moved toward engaged position, means for arresting the motion of said clutch toward engaged position upon partial engagement of the clutch members, means providing a variable suction connection from said intake system to said pressure responsive means, means decreasing the capacity of said suction connection upon the actuation of said acceleration control mechanism to accelerate said motor and means providing an auxiliary air inlet connection to said pressure responsive means, said air inlet connection being operative upon the actuation of said acceleration control mechanism to admit atmosphere to said pressure responsive means.

19. In an automatic control for the clutch of a motor vehicle, the combination with a mechanism for controlling the acceleration of the motor, of a pressure responsive means for releasing the clutch, means providing a passage between the pressure responsive means and the intake system of the motor, means operating when the motor is idling to open said passage whereby the vacuum from the intake system actuates said pressure responsive means to release said clutch, means operating upon the actuation of said acceleration control mechanism to reduce the vacuum acting on said pressure responsive means whereby said clutch is moved toward engaged position, means for arresting the motion of said clutch toward engaged position upon partial engagement of the clutch members, means providing a variable suction connection from said intake system to said pressure responsive means, means decreasing the capacity of said suction connection upon the actuation of said acceleration control mechanism to accelerate said motor and means providing an auxiliary air inlet connection to said pressure responsive means, said air inlet connection being operative upon the actuation of said acceleration control mechanism to accelerate said motor to increase the capacity of said air inlet connection.

20. In an automatic control for the clutch of a motor vehicle, the combination with a mechanism for controlling the acceleration of the motor and the carburetor riser of said motor of a pressure responsive means for releasing the clutch, means providing a passage between the pressure responsive means and the intake system of the motor, means operating when the motor is idling to open said passage whereby the vacuum from the intake system actuates said pressure responsive means to release said clutch, means operating upon the actuation of said acceleration control mechanism to reduce the vacuum acting on said pressure responsive means whereby said clutch is moved toward engaged position, means for arresting the motion of said clutch toward engaged position upon partial engagement of the clutch members, and means providing a passage between said carburetor riser and said pressure responsive means, said last mentioned passage being subject to vacuum in the carburetor riser when said motor is idling, and being subject to atmospheric pressure in increasing amounts upon the actuation of said acceleration control mechanism.

21. In an automatic control means for the clutch of a motor vehicle, the combination with a mechanism for controlling the acceleration of the motor, of a means providing a passage connected to the intake system of the motor, a member responsive to the suction in said passage for releasing the clutch, a main valve in the passage operable to control communication between said passage and the intake system and between said passage and the atmosphere, an auxiliary valve in said passage for closing the passage between said member and the atmosphere, means operating when the motor is idling to actuate the main and auxiliary valves to provide direct communication between the intake system and said member to release said clutch, means operating upon the actuation of said acceleration control mechanism to actuate said main valve to close the passage to the intake system and open the passage to the atmosphere whereby the clutch is moved toward engaged position, means operating upon the partial engagement of said clutch to close said auxiliary valve, means providing an auxiliary passage communicating with the intake system and with the main passage between the auxiliary valve and the clutch actuating member for transmitting suction to this portion of the main passage to arrest motion of the clutch toward engaged position when the auxiliary valve is closed and to make possible the partial release of said clutch while the auxiliary valve is closed and a third valve associated with said main passage between said clutch actuating member and said auxiliary passage operable to close communication between said member and said intake system and to open communication between said member and the atmosphere and thus render said system inoperative.

22. In an automatic control means for the clutch of a motor vehicle, means providing a passage connected to the intake system of the motor, a member responsive to the suction in said passage for releasing the clutch, a main valve in the passage operable to control communication between said passage and the intake system and between said passage and the atmosphere, an auxiliary valve in said passage for closing the passage between said member and the atmosphere, means operating when the motor is idling to actuate the main and auxiliary valves to provide direct communication between the intake system and said member to release said clutch, means operating upon the actuation of said acceleration control mechanism to actuate said main valve to close the passage to the intake system and open the passage to the atmosphere whereby the clutch is moved toward engaged position, means operating upon partial engagement of said clutch to close said auxiliary valve, means providing an auxiliary passage communicating with the intake system and with the first mentioned passage between said auxiliary valve and said member for admitting suction to said passage adjacent to said member to arrest motion of said clutch toward engaged position and to effect a partial disengagement of said clutch while said auxiliary valve is closed, said auxiliary passage being provided with a variable restriction, said restriction increasing as said acceleration control mechanism is actuated to accelerate said motor.

23. In an automatic control means for the clutch of a motor vehicle the combination with a mechanism for controlling the acceleration of the motor of a means providing a passage connected to the intake system of the motor, a member responsive to the suction in said passage for releasing the clutch, a main valve in the passage operable to control communication between said passage and the intake system and between said passage and the atmosphere, an auxiliary valve in said passage for the closing the passage between said member and the atmosphere, resilient means for holding said auxiliary valve closed, a pressure responsive member exposed to the pressure in the passage beyond said auxiliary valve for moving said auxiliary valve to open position, means operable when said motor is idling to open said main valve to provide communication between said passage and the intake system, means allowing vacuum from said intake system to be transferred beyond said auxiliary valve and open said auxiliary valve and thus provide direct communication between said intake system and said first mentioned member whereby said clutch is moved toward released position, means operating upon the actuation of said acceleration control mechanism to actuate said main valve to close the passage to the intake system and open the passage to the atmosphere whereby said clutch is moved toward engaged position, the resilient means associated with said auxiliary valve acting to close said auxiliary valve upon a predetermined drop in vacuum in said passage beyond said auxiliary valve incident to a partial engagement of said clutch, means providing an auxiliary passage communicating with the intake system and with said first mentioned passage between said auxiliary valve and said clutch actuating member for admitting suction to said clutch actuating member to arrest the motion of said clutch toward engaged position and to make possible the partial release of said clutch when said auxiliary valve is closed, means decreasing the capacity of said auxiliary passage upon the actuation of said acceleration control mechanism and a second resilient means associated with said auxiliary valve, said second resilient means acting to open said auxiliary valve upon the actuation of said acceleration control mechanism.

24. In an automatic control means for the clutch of a motor vehicle, the combination with a means for controlling the acceleration of the motor and a carburetor riser having a throttle valve therein, of means providing a passage connected to the intake system of the motor, a member responsive to the suction in said passage for releasing the clutch, a main valve in the passage operable to control communication between said passage and the intake system and between said passage and the atmosphere, an auxiliary valve in said passage for closing communication between said member and the atmosphere, and pressure actuated means responsive to the pressure in said carburetor riser thru a port, said port being located so as to be subject to vacuum while said motor is idling and to be subject to atmospheric pressure upon the actuation of said throttle valve, said pressure actuated means operating said main valve to open communication between said passage and said intake system while said motor is idling, and a resilient means associated with said pressure actuated means, said resilient means acting to close said main valve upon the actuation of said throttle valve thereby closing communication between said passage and said intake system and opening communication between said passage and the atmosphere, means when the motor is idling to transfer suction from said intake system beyond said auxiliary valve, means allowing said suction to open said auxiliary valve and thus provide direct communication between said intake system and said member and thereby release said clutch, a resilient means associated with said auxiliary valve, said resilient means acting to close said auxiliary valve on the partial engagement of said clutch, and means operable upon the actuation of said acceleration control mechanism to transmit atmosphere to said member and thereby complete engagement of said clutch.

25. In an automatic control means for the clutch of a motor vehicle, the combination with a mechanism for controlling acceleration of the motor and the clutch pedal of said vehicle, of a pressure responsive means for releasing the clutch, means providing a passage between the pressure responsive means and the intake system of the motor, means operating when the motor is idling to open said passage whereby the vacuum from the intake system actuates the pressure responsive means to release the clutch, means operating upon the actuation of said acceleration control mechanism to reduce the vacuum acting on the pressure responsive means whereby the clutch is moved toward engaged position, and means operable upon the initial motion of said clutch pedal to close communication between said pressure responsive means and said intake system and to open communication between said pressure responsive means and the atmosphere and thus render said automatic control means inoperative.

26. In an automatic control means for the clutch of a motor vehicle, the combination with a mechanism for controlling the acceleration of the motor, of means providing a paassage connected to the intake manifold of the motor, a member responsive to suction in said passage for releasing the clutch, a main valve in said passage operable to control communication between said passage and the intake manifold and between said passage and the atmosphere, an auxiliary valve for controlling communication between said passage and the atmosphere, means operating when the motor is idling to open said passage to provide direct communication between the intake manifold and said member to release said clutch, means operating upon the actuation of said acceleration control mechanism to actuate said main valve to close the passage to the intake manifold and open the passage to the atmosphere whereby the clutch is moved toward engaged position, means operating upon the partial engagement of said clutch to close said auxiliary valve, auxiliary means of transferring vacuum from the intake manifold to said member for releasing the clutch whereby the final clutch engagement is modified, and a third valve associated with said main passage between said clutch actuating member and said auxiliary vacuum means and operable to close communication between said clutch actuating member and the manifold to render said system inoperative.

27. In an automatic control means for the clutch of a motor vehicle, the combination with a mechanism for controlling the acceleration of the motor and a clutch pedal for manually actuating the clutch, of means providing a passage connected to the intake manifold of the motor, a member responsive to suction in said passage for releasing the clutch, means controlled by the acceleration of the motor for controlling communication between said passage and the intake manifold of the motor to thus regulate the degree of vacuum in said passage, and means operated upon the manual depression of said clutch pedal to close communication between said member and the intake manifold and thus render said automatic control means inoperative.

RALPH S. WHITTINGTON.